Sept. 1, 1970 G. W. MEEK 3,526,393

COOLING TOWER

Filed July 1, 1968

George W. Meek
By Eric G. Munson
Attorney

United States Patent Office 3,526,393
Patented Sept. 1, 1970

3,526,393
COOLING TOWER
George W. Meek, P.O. Box 1909,
Fort Myers, Fla. 33901
Filed July 1, 1968, Ser. No. 741,609
Claims priority, application Sweden, July 7, 1967,
10,378/67
Int. Cl. F24f 3/14
U.S. Cl. 261—102                                           7 Claims

ABSTRACT OF THE DISCLOSURE

A contact body comprising a plurality of mutually parallel layers which include undulated folds to form channels from end to end is provided in a cooling tower. Reinforcing members are mounted at least at one end of the body thereof along the drainage edge of the layers. The reinforcing members extend in a direction parallel to the mutually parallel layers. These reinforcing members have a greater mechanical strength than the layers to protect the layers from deformation.

BACKGROUND OF THE INVENTION

More particularly this invention relates to cooling towers of the type equipped with at least one contact body consisting of thin layers or sheets which are positioned in mutually parallel relationship and which are at least partly undulated or corrugated and which form channels extending from end to end for a gas, primarily air, and a liquid, primarily water, passing simultaneously through the contact body while being in contact with one another. The layers may at the edge of the body where the liquid is drained off, be formed with means such as projections or serrations counteracting an overbridging by the liquid of the channels although this specific form of the draining edge is not a condition.

Examples of contact bodies of the type in consideration are disclosed in the Pats. Nos. 2,809,818 and 3,262,682 and the copending application Ser. No. 380,357, filed July 6, 1964, by Carl Georg Munters. As disclosed in the last-mentioned patent and the copending application, all layers are undulated and the folds cross one another in adjacent layers.

PURPOSE OF THE INVENTION

One main object of the invention is to provide insert members, preferably having the form of discs, at that edge of the contact body where the projections are located, said members having greater mechanical strength than the layers and the projections, respectively, so as to have them protected against mechanical action or deformation. This protection becomes effective during transportation of the contact bodies and in particular also during their operation when they are subjected to a relatively great load, constituted, for example, by the action of the liquid, primarily water, especially when ice is deposited on the layers. The insert members are preferably located straight in front of bearers supporting the contact body within the cooling tower. Due to said members the layers can be of minor thickness and be positioned in a more spaced relationship to one another than has been possible hitherto. It is easily understood that the layers and the projections will be loaded specifically to an increasing degree in response to an increase of the spacing between the layers.

Another object of the invention is to provide projections which are individual for each fold and which in spite thereof are capable of preventing an overbridging by, or clogging of, the water even when so great speeds of the air stream are used as 3.5 to 4 meters per second and more and when the air passes through the channels of the contact body in a direction opposite to the direction of flow of the water i.e. in an upward direction from the bottom of the cooling tower. At the same time, the height of the folds or corrugations of the layers can be kept within relatively narrow limits without any risk that the channels are overbridged by particles of water.

BRIEF DESCRIPTION OF DRAWINGS

Further objects and advantages of the invention will become apparent from the following description, considered in connection with the accompanying drawing which forms part of this specification and of which.

DESCRIPTION OF SPECIFIC EMBODIMENTS

Figure 1:
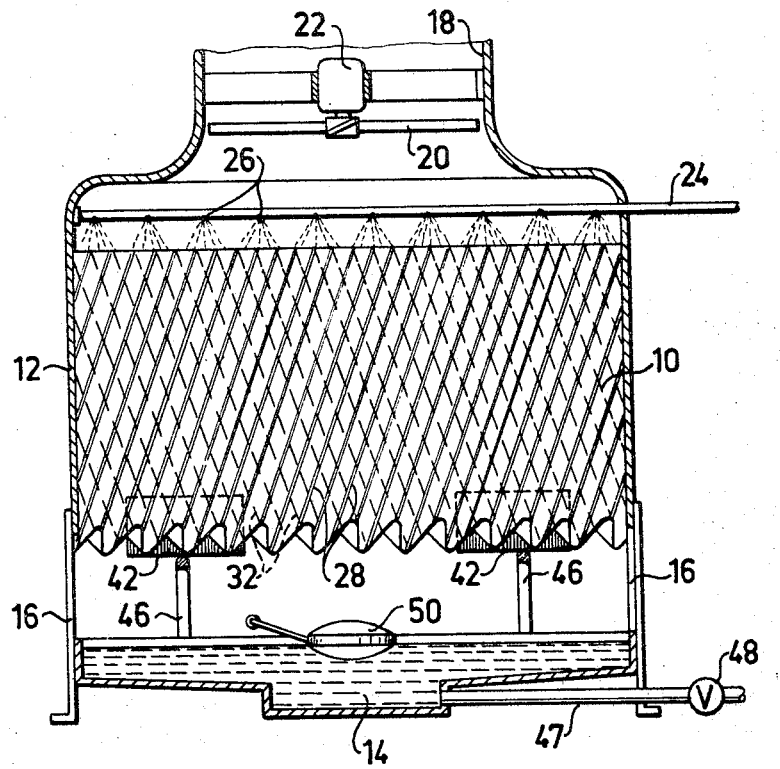
FIG. 1 is a vertical longitudinal section through a cooling tower constituted according to the invention.

In the embodiment illustrated in the drawing, a contact body 10 is encased by a casing 12, which at the bottom is designed as a water sump 14. Outside the contact body the casing has openings 16 for introduction of air which passes through the contact body 10 in an upward direction and escapes through an outlet 18 housing a fan 20 with a driving motor 22. Water is supplied to the contact body 10 at the top by means of a spraying device 24 formed at the bottom side with outlet holes 26.

Figure 2:
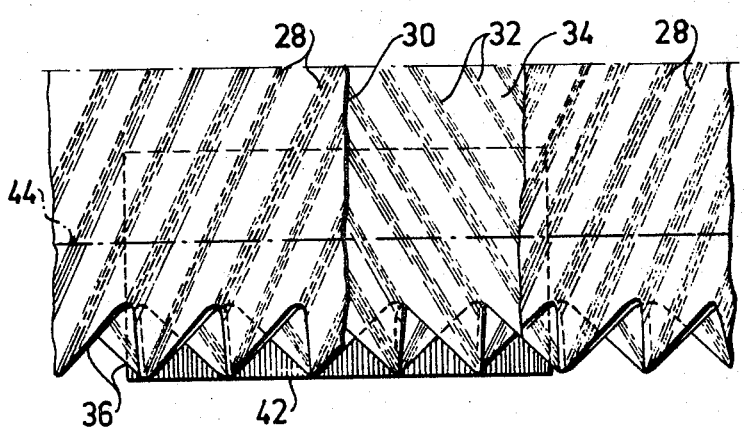
FIG. 2 is a partial view in a larger scale of the lower portion of a contact body.

The contact body 10 is composed of thin layers or sheets which all are undulated or corrugated and positioned vertically upright. The folds or corrugations cross one another in adjacent layers at an angle towards the vertical plane which is 45 degrees or minor, preferably ranging within 25 and 40 degrees. The layers bear against one another and are at their points of contact glued together by a suitable adhering substance such an adhesive. Water and air flow in countercurrent through the contact body 10. In the drawing, lines 28 denote the corrugations in each second layer 30 and lines 32 the corrugations in each intermediate layer 34. In FIG. 2, the uppermost layer 30 is assumed to be cut away over a central portion so as to make the underlying layer 34 visible. Between the layers in the contact body channels penetrating from end to end both in the horizontal as in the vertical plane are obtained, which channels have continously varying widths from zero at the places of contact between the layers up to the double height of the folds. The height of the folds can reach from 5 to 40 mm. and is suitable from 10 to 30 mm.

The layers are preferably made of fibers or cellulose or inorganic material such as asbestos. The paper layer of cellulose or asbestos is given improved wet strength by impregnation with a substance suited for this purpose, such as, for example, a resin, such as phenolic resin. The layers may also be made of a synthetic plastic material.

The layers 30, 34 are at their lower edge formed with projections or serrations 36 which are formed in each individual fold and which have a great vertical dimension. They are formed by cutting by means of a saw blade which is inclined relatively to the edges at an acute angle. The layers are manufactured according to a method described in the Pat. 3,470,280 filed Oct. 31, 1966, jointly by Carl Georg Munters and George W. Meek, under continuous advance of a web, the folds being formed at an inclined angle to the direction of advance of the web which direction coincides with longitudinally extending edges of said web. The cutting direction of the saw blade is transversal to said longitudinally extending edges, said saw blade at the same time forming an acute angle to a plane which is assumed to be positioned along one of the ridges of the folds on one or the other side of the layers.

In this way formation of any waste is avoided in the manufacture of the layers. When assembling the contact body the layers cut from the web are alternately turned by 180 degrees so that the folds 28, 32 will cross each other and at the same time the obliquely cut surfaces 38 of the projections 36 in adjacent layers will form an angle to one another as is shown in FIG. 3.

Figure 3:
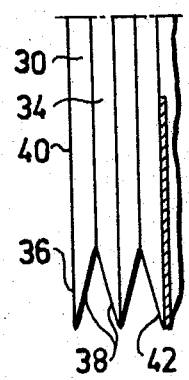
FIG. 3 is a partial view of the portion shown in FIG. 2 perpendicularly viewed to the plane of FIG. 2.

The inclined surfaces 38 of the projections form an angle to the plane of the FIGS. 1 and 2 of the drawing i.e. to the plane 40 in FIG. 3 which coincides with the ridges of the folds, which angle can be substantially minor than 45 degrees, such as from 15 to 30 degrees which results in that the length of the projections can be substantially greater than the height of the folds or corrugations such as twice and even more. This feature in combination with the fact that each ridge terminates in a point so that the number of drainage points becomes very great, will result in that the water flowing downwards along the layers in the contact body is not capable, in spite of the action of the capillary force assisted by the stream of air flowing in an upward direction, to be collected to larger drops which bridge over the interspace between the layers and would create an increase of pressure counteracting the passage of the air. This holds true also when the folds or corrugations have a relatively little height such as between 10 and 15 mm. and when so extreme high air velocities are used as about 4 meters per second or more. Both these factors contribute to impart to the cooling tower a high capacity in relation to the volume of the contact body.

According to the invention, the side of the contact body where the serrations 36 are formed is provided with insert members 42 having the shape of thin discs, frames made of metal wire or a similar structure, which have a greater mechanical strength than the layers. These insert members can be interposed between two layers as is specifically shown in FIG. 3, and the members may be secured to the layers by glueing by means of a suitable adhesive. Said adhesive may be constituted by polyvinyl chloride. Furthermore the entire lower edge portion of the body up to a level 44 can be immersed into a solution or emulsion of said adhesive. Hereby simultaneously with the rigidly securing of the insert members 42 consisting of thin metal sheet, for example, to the contact body, a reinforcement of the lower edge portion is obtained as is described in the Pat. 3,395,903, filed July 15, 1966 by Per Gunnar Norbäck and George W. Meek.

The insert members 42 are disposed straight in front of bearers 46 in the casing 12 which support the contact body 10. This latter is thus fixed in its correct position and the lower edge of the body, the strength of which is impaired by the serrations will thus not yield to, or be damaged by, action of the load on the contact body constituted by, for example, water flowing down along the layers, and possible deposits of ice. This permits to make the layers 30, 34 from a particularly thin material or from a material having no strength of its own such as sheets of a soft plastic material. The contact body will obtain perfect carrying strength even with great median spacing between the layers. The insert members are of such shape that they practically do not at all encroach on the free flow area at the lower edge of the contact body. The insert members can be distributed over the lower area of the contact body, in particular perpendicularly to the drawing plane of FIG. 3 with a mutual spacing of a few decimeters.

The cooled water is led from the sump 14 through a conduit 47 controlled by a valve 48 to the place of usage to be returned in known manner to the spraying device 24. The water level in the sump is controlled by means of a floating member 50 so as to cause fresh water to be added for replacing of losses due i.a. to evaporation within the contact body.

The invention is applicable also to moistening devices in which air is to be given an increased relative moisture content.

While one more or less specific embodiment of the invention has been shown and described, it is to be understood that this is for purpose of illustration only and that the invention is not to be limited thereby.

What I claim is:
1. In a cooling tower, a contact body comprising:
   (a) a plurality of mutually parallel layers which are at least partially undulated folds to form channels from end to end,
   (b) said channels providing for simultaneous passage of gas and liquid to effect contact therebetween, and
   (c) means mounting reinforcing members at least at one end of the body thereof along the drainage edge of the layers,
   (d) said reinforcing members being inserted between adjacent layers of the contact body extending in a direction parallel to the mutually parallel layers and having a greater mechanical strength than the layers to protect the layers from deformation.
2. An assembly as defined in claim 1 wherein the mutually parallel layers include serrations along the drainage edge thereof to prevent overbridging of the channels by the liquid.
3. An assembly as defined in claim 2 wherein said serrations are formed in each individual fold along sectional planes crossing at an acute angle the planes which extend through the ridges of the folds on either side of the layers.
4. An assembly as defined in claim 1 wherein the contact body includes projections which terminate in a point along the drainage edge of the layers.
5. An assembly as defined in claim 1 including support members located below the contact body within the cooling tower, said reinforcing members being disposed on said support members.
6. An assembly as defined in claim 5 wherein the reinforcing members have the shape of thin discs and are fixedly mounted between adjacent layers of the contact body.
7. An assembly as defined in claim 6 wherein the contact body includes projections which terminate in a point along the drainage edge of the layers.

References Cited
UNITED STATES PATENTS

| | | | |
|---|---|---|---|
| 2,986,379 | 5/1961 | Kramig | 261—112 X |
| 3,052,105 | 9/1962 | Bowman et al. | 261—112 |
| 3,395,903 | 8/1968 | Norback et al. | 261—112 |

FRANK W. LUTTER, Primary Examiner

S. H. MARKOWITZ, Assistant Examiner

U.S. Cl. X.R.
261—103, 112